Figure 4:
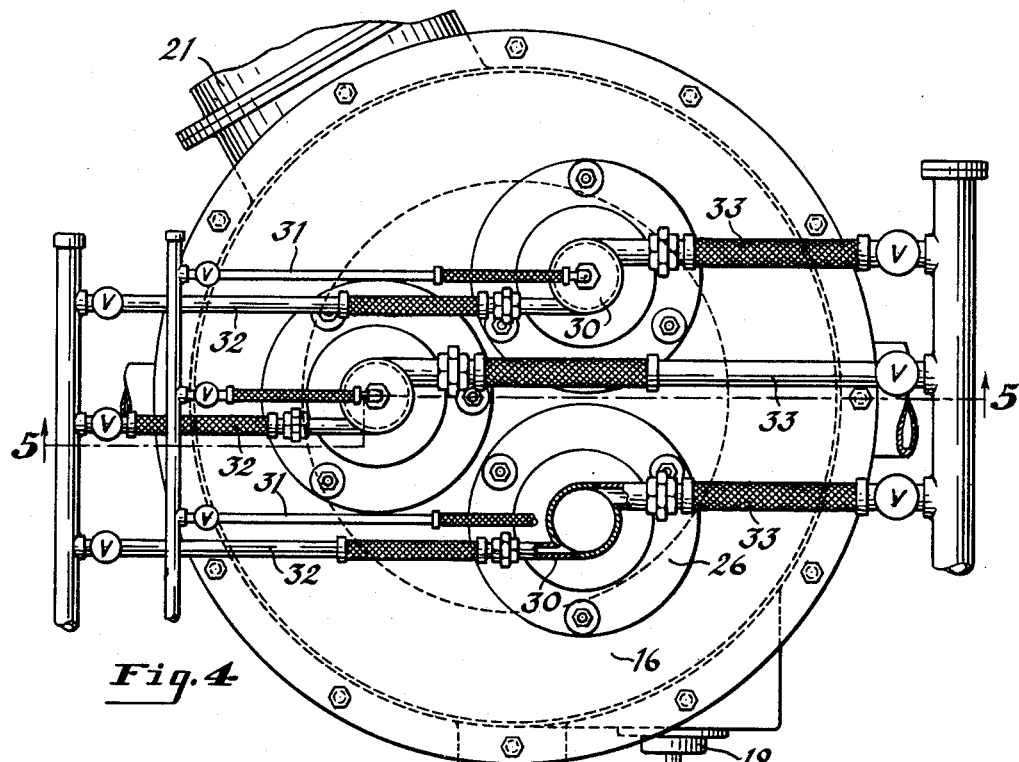

July 14, 1953 K. W. STOOKEY 2,645,566
HIGH-TEMPERATURE REACTOR
Filed Dec. 12, 1949 3 Sheets-Sheet 1
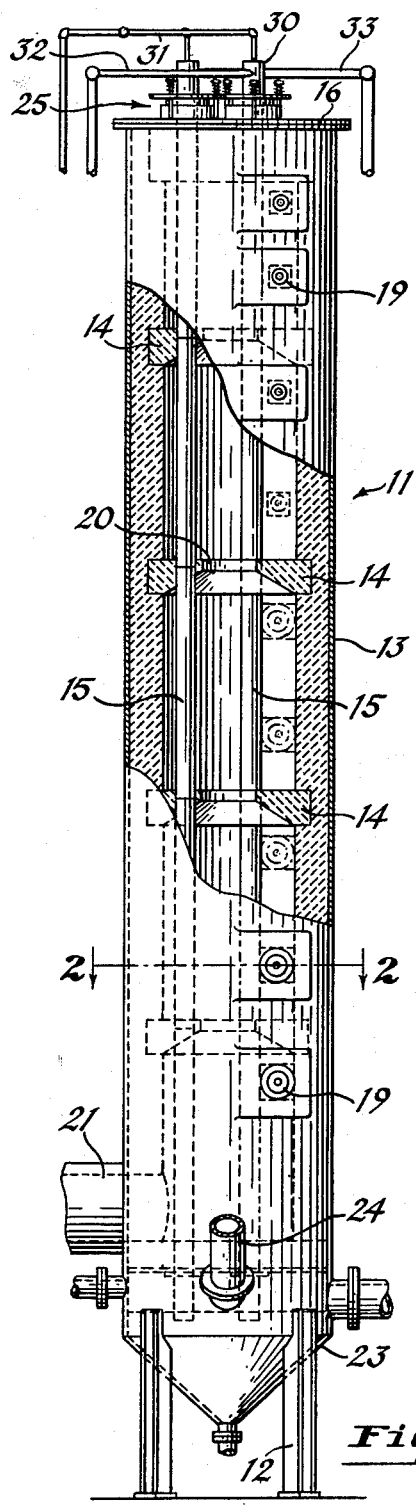
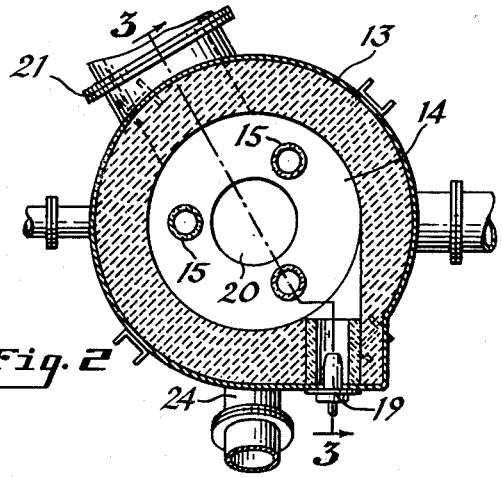
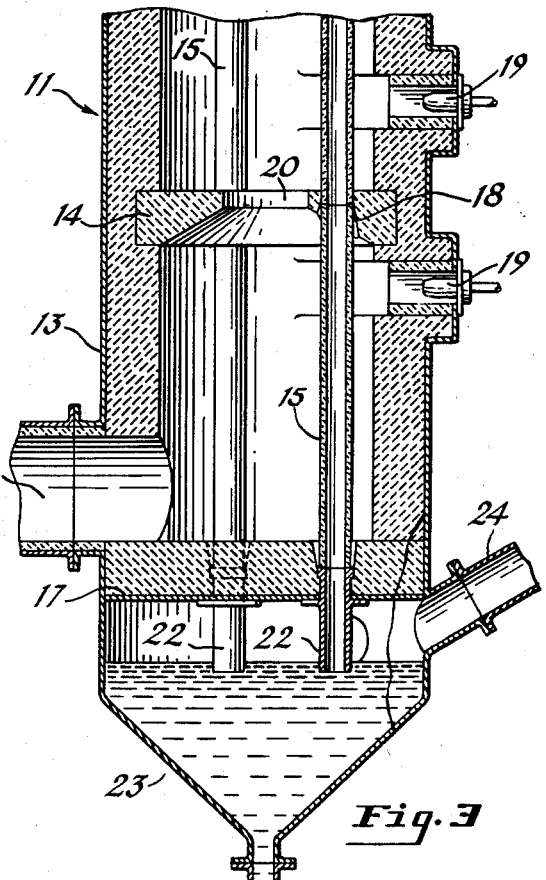
INVENTOR
Kenneth W. Stookey
BY Ely & Frye
ATTORNEYS July 14, 1953 K. W. STOOKEY 2,645,566
HIGH-TEMPERATURE REACTOR
Filed Dec. 12, 1949 3 Sheets-Sheet 2

INVENTOR
Kenneth W. Stookey
BY Ely & Frye
ATTORNEYS

INVENTOR
Kenneth W. Stookey
BY Ely & Frye
ATTORNEYS

Patented July 14, 1953

2,645,566

UNITED STATES PATENT OFFICE 2,645,566

HIGH-TEMPERATURE REACTOR

Kenneth W. Stookey, Cleveland, Ohio, assignor to The Gas Machinery Company, Cleveland, Ohio, a corporation of Ohio Application December 12, 1949, Serial No. 132,553

7 Claims. (Cl. 23—277)

The present invention relates to a new and novel reactor for continuously carrying out thermal reactions and to the method of carrying out such reactions therein. More particularly this invention relates to a continuous reactor and to the method for carrying out high temperature reactions therein at 2000° F. up to about 3000° F. and at even higher temperatures.

In the past continuous tubular reactors for carrying out high temperature reactions have been constructed with metal alloy tubes which are capable of withstanding temperatures up to about 1800° F. Temperatures in excess of 2000° have not been practical in such reactors since the tubes failed due to loss of strength and chemical action at the elevated temperatures. Thus tubular reactors for continuous commercial processes have been used only when temperatures below 2000° F. have been employed.

In an effort to overcome the failure of the metal alloy tubes used in the prior art reactors it has been suggested that the tubes be suspended from the top instead of being supported at the bottom so as to reduce the load thereon, thus enabling the use of slightly higher temperatures before complete failure of the metal tubes. Temperatures in excess of 2000° F. are not possible even with this improvement.

In the reactor of the present invention it is possible to carry out continuous thermal reactions of fluid reactants at higher temperatures than was possible heretofore. The reactor contains tubes which may be of any suitable material which will withstand the high temperatures, such as a refractory material. It has been found, however, that silicon carbide tubes, sometimes known by the trade name "Carborundum," are well suited for the present invention since they possess suitable heat transfer characteristics and also have the necessary strength at high temperatures and are chemically inert. Generally the reactants are passed through one or more tubes in a heating zone which is heated by hot combustion gases supplied by one or more burners arranged along the sides of the reactor. One particular feature of the invention is the overall concurrent flow of the reactants and the combustion gases through the reaction tubes and reactor respectively as will be described more fully hereinafter.

Another feature of the present invention is that the reactor may be divided into two or more transverse sections, each of which may be heated to different temperatures whereby the temperature within the reaction tube will vary from top to bottom as may be desired for any particular operation.

According to the present invention temperatures well in excess of 2000° F. and as high as 3000° F. and higher are possible in a reactor, the tubes of which are supported partially or entirely at the bottom thereof.

In a reactor according to the present invention it is possible to carry out many reactions not previously possible on a commercial scale and also to carry out known commercial processes in a far more efficient and economical manner due to the effective use of the higher temperatures. Likewise it is now possible to carry out reactions which were unknown heretofore.

For example the reactor may be used for high temperature cracking of hydrocarbons to hydrogen and carbon in almost theoretically quantitative yields. Not only is the yield of hydrogen and carbon very high but the cracking step, due to the high temperatures used, i. e. from about 2200° F. to about 2700° F., can be carried out in much shorter time than heretofore, whereby the total output of the reactor is far greater than prior reactors of similar size.

It will be understood that various reactions can be carried out in the absence of a catalyst in which case the tube passage may be completely open or may be partially or entirely filled with pieces of inert refractory material known as corebreakers for better dispersion of the reactants and better heat transfer. However, various other reactions require a catalyst and in this case, the desired catalyst may be placed within the tube on suitable carriers for contact by the fluid reactants.

It is, therefore, an object of the present invention to provide a reactor in which reactions may be carried out at temperatures above 2000° F. up to 3000° F. and higher.

Another object of the present invention is to provide a method for carrying out high temperature reactions.

Still another object of the invention is to provide a reactor and method for employing same in which the heating zone is divided into sections the temperatures of each of which may be controlled within certain limits.

Still another object is to provide a high temperature tubular reactor in which the reaction tubes are composed of a refractory material and are supported at the bottom thereof.

Another object of the invention is the use of tubes composed of aligned sections having gas tight joints between the abutting ends thereof.

Figure 5:
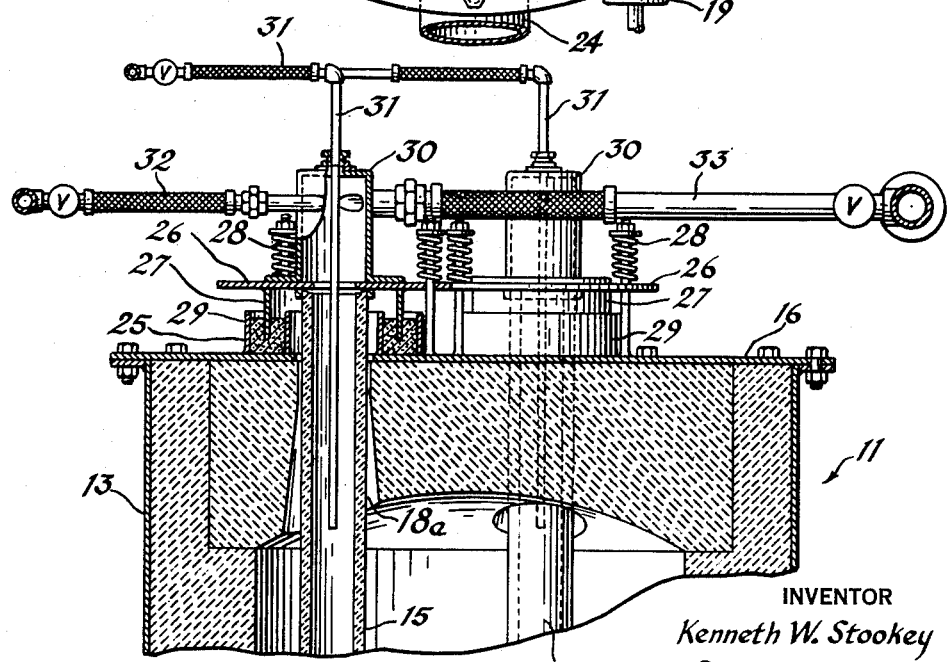
Figure 6:
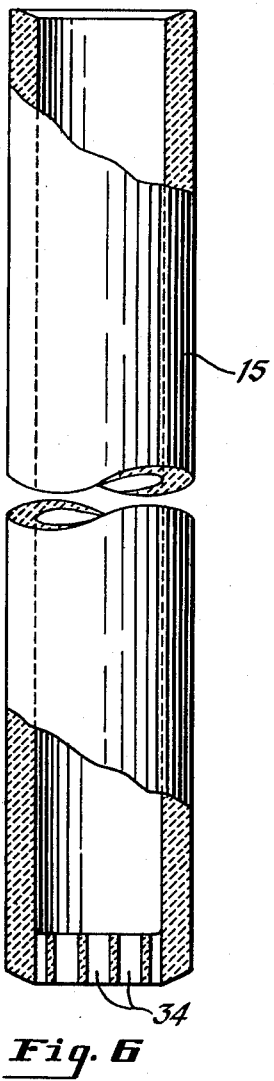
Figure 7:
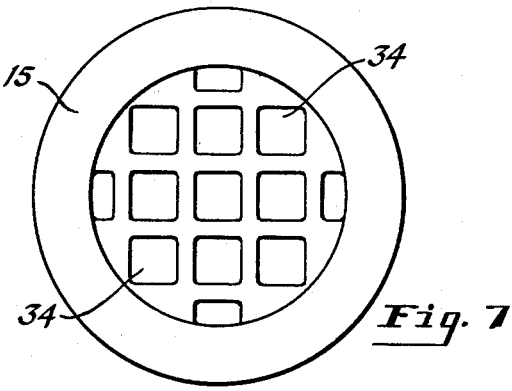
Figure 8:
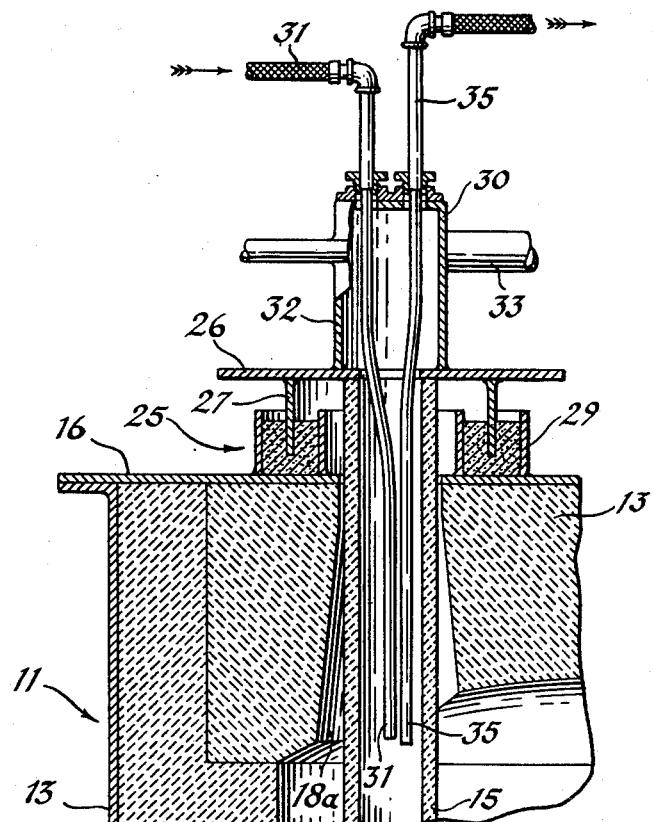

Other objects of the invention will be apparent from the following detailed description and the accompanying drawings in which, Figure 1 is a side elevation, partly in cross section of a reactor according to the present invention, Figure 2 is an enlarged horizontal cross sectional view taken along line 2—2 of Figure 1, Figure 3 is an enlarged vertical cross sectional view of the lower part of the reactor shown in Figure 1, taken along line 3—3 of Figure 2, Figure 4 is an enlarged top plan view partly broken away of the reactor shown in Figure 1, Figure 5 is an enlarged vertical cross sectional view of the upper part of the reactor shown in Figure 1 taken along line 5—5 of Figure 4, Figure 6 is a side elevation, partly in section of a modified reactor tube for use in the reactor shown in Figure 1, Figure 7 is a plan view of the reactor tube shown in Figure 6, and Figure 8 is a vertical section of a modification of a portion of the reactor shown in Figure 5.

Referring to Figure 1, the reactor 11 which rests upon supports 12 comprises a refractory lined shell 13. At spaced intervals throughout the length of the shell 13 there are provided horizontal walls 14 preferably of refractory materials which divide the inside of the shell 13 into sections as will be described more fully hereinafter. The particular number of walls 14 employed will depend upon the nature of the desired reaction to be carried out and may vary from four, as shown in Figure 1, or even more, down to one, or in the case of small reactors or relatively short reactors the dividing walls may be eliminated altogether. Reaction tubes 15 extend throughout the shell 13 and pass through the top 16, the bottom 17 as well as through suitable openings 18 in the walls 14.

The number of reaction tubes may vary in accordance with the desired capacity of the reactor. Although three reaction tubes 15 have been shown it will, of course, be understood that a greater or lesser number may be used under certain conditions or, if desired only one reaction tube may be used.

In the wall of the shell 13 are arranged one or more burners 19 or the like for the combustion of a fuel, such as a petroleum oil or other fluid fuel, for supplying heat to the reactor. If desired, one or more burners may be disposed in each section of the reactor; two burners having been shown in Figure 1 merely for illlustrative purposes. It is also contemplated that some of the sections may not have any burners or that the burners in any one section may not be used at all times.

The dividing walls 14 are provided with openings 20 for the passage of combustion gases from one section to the next in a downward direction while providing a baffling effect. As shown in the drawings a flue 21 is provided at the bottom of the reactor 11 for withdrawing the combustion gases. It will be seen therefore that the combustion gases, no matter in which section the burner or burners 19 may be located, will move in a generally downward direction, modified by turbulence and baffling, through the reactor 11 to the flue 21.

The burners 19 are preferably placed in the wall of the shell 13 so that the flame and combustion gases will be directed tangentially rather than radially. Such an arrangement eliminates localized hot spots in the reaction tubes which might cause possible failure of the tubes and it also provides a more uniform heating of the tubes in any one section.

By varying the number of burners 19 in the various sections or by varying the temperature of combustion by varying the air-fuel ratio, it is possible to vary the effective temperature of the tube at different points. Under some circumstances it may be desirable to increase the temperature of the reaction tube from top to bottom, while under different circumstances the reverse may be desirable. Still again it may be desirable to provide the hottest section at or near the midpoint of the reaction tube.

The reaction tubes 15 may be of any desired material which will withstand the maximum desired temperature. However, one of the most suitable materials available today are refractory materials, such as silicon carbide, sometimes known to the trade as "carborundum." This material may be shaped into tubes or tube sections which can be employed in the present reactor.

Frequently it will be desirable to employ a reactor of substantial height, such as 25 or 30 feet or higher. In this case it may be desirable to utilize reaction tubes composed of two or more aligned sections, superimposed on each other and abutting end to end. In order to obtain a gas proof joint between the sections of refractory tubing it has been found that a ball and socket joint may be used as shown and described, for example, in United States Patent No. 2,472,497 granted to K. W. Stookey. This joint essentially comprises one convex tube end and one concave tube end which fit to form a gas proof joint while still permitting a limited amount of angular movement between adjacent sections. The use of continuous refractory tubes of lengths in excess of eight or ten feet is generally not satisfactory with available materials. Not only is the construction and formation of such tubes impractical but also they are more likely to be affected adversely by the operating conditions in the reactor.

When reaction tubes in sections are used it is generally preferable though not essential that the tube section joints be located in the dividing wall 14 as shown in Figures 1 and 3.

Referring more particularly to Figure 3, the details of the bottom of the reactor 11 are more clearly shown. The reaction tubes 15 extend down into the refractory lining at the bottom of the shell and rest upon dip pipes 22 which are secured, by welding or the like, to the bottom plate 17. The pipes 22 extend downwardly from the bottom of the reactor into the water seal 23 to a point beneath the water level maintained therein. The water seal 23 affords a degree of control on the pressure in the reaction tubes, quenches the gaseous products and cleans the gas by collecting condensibles and solid matter which might be contained in the gaseous products and prevents possible backflow of gas. The product gas is removed from the system through line 24.

Referring particularly to Figures 4 and 5, the reaction tubes 15 project through the top of the shell 16 and are provided with seals 25, such as sand seals, for accommodating thermal linear expansion of the reaction tubes 15. Although various types of seals may be used, the type of sand seal shown comprises a top annular plate 26 having a depending annular flange 27. The plate 26 is urged downwardly by springs 28 so that the flange 27 will extend into the sand contained in an annular trough 29 mounted on the top of the shell 16. Above the plate 26, a header 30 is provided into which one or more of the fluid reactants can be introduced. In the modification illustrated a hydrocarbon oil may be introduced thru lines 31, steam may be introduced through lines 32 and air, $CO_2$ or other gas may be introduced through lines 33. Each of the lines 31, 32 and 33 are provided with flexible sections to compensate for linear expansion of the reaction tube. As seen in Figure 5, the oil line 31 may extend downwardly into the reaction tube 15 while the gaseous reactants can be introduced tangentially into the header 30. It will be understood that the gaseous reactants may be pre-mixed and/or preheated whenever desired.

Although the invention has been described and illustrated with reference to a reaction involving oil, steam and air, $CO_2$ or other gas it will be understood that these reactants are merely given by way of illustration and that other reactants or a single gas or fluid can be treated, such as, for example, the thermal treatment of propane or other hydrocarbon fluid.

With particular reference to Figures 3 and 5 it will be seen that the refractory lining of shell 31 and the refractory walls 14 are provided with tapered openings 18 and 18a through which the reaction tubes 15 pass, the smallest portion of the opening being slightly larger than the tube to allow for lateral thermal expansion thereof. The tapered portions of the openings 18 and 18a permit a more gradual change in temperature between those portions of the tubes 15 which are more directly exposed to the hot combustion gases and those portions of the tubes which are not in such direct contact with said gases.

The dividing walls 14 are preferably made of refractory material and, as shown in the drawings, are provided with a central opening 20 for passage of the hot combustion gases and with spaced openings 18 around the central opening for the reaction tubes 15. Of course, more or less than three reaction tubes may be used when desired. However, when one tube is employed it will generally pass through the centers of the shell 13 and walls 14 and gas passage openings in the walls 14 will be provided around the central tube 15.

With reference to the Figures 6 and 7, the tube 15 may be provided at or near the bottom thereof with a grid 34 which is generally composed of the same refractory material as the tube. When catalytic reactions are to be carried out, the catalyst, supported on carrier particles, is placed in the tubes on the grid. One suitable carrier for the catalyst is aluminum oxide which may have the shape of conventional Raschig rings.

Occasionally it may be desirable to bleed off some of the initial gases or vapors formed when the hydrocarbon oil is first vaporized in the reactor and before the oil vapors or gases have been fully treated in the reactor. Such initial gases may be used for any desired purpose and may for example be blended with the final product gases. To accomplish this a bleed tube 35 as shown in Figure 8 may be employed. The apparatus shown in Figure 8 corresponds with that shown in Figure 5 except for the tube 35, which extends down into refractory tube 15 about the same distance as and parallel to line 31. The initial gases are drawn into tube 35 and are withdrawn as indicated by the arrow.

In operation one or more of the burners 19 are turned on so as to heat the reactor 11 and the reaction tubes 15 to the desired temperatures. The hot combustion gases enter the section or sections, between the walls 14, tangentially and swirl around the tubes 15 in a generally downwardly spiral manner and are funnelled through gas openings 20 to the next lower section and finally to the flue 21. It will be clear that the temperature of any section may be controlled by controlling the burners 19 in the respective sections. As the temperature rises the tubes expand both laterally and longitudinally. Since the tubes 15 are supported by the dip pipes 22 at the bottom of the reactor the longitudinal expansion takes place in an upward direction. The sand seal 25 permits this expansion while keeping the inside of the reactor sealed. The header 30 and inlet lines 31, 32 and 33, by virtue of the flexible sections are permitted to rise with the expansion. The lateral expansion is accommodated by the openings 18 and 18a. Should there be any tendency for the tubes 15 to become distorted or bent by compression caused by the springs 28, this is overcome by the ball and socket joints between the tube sections which permits limited angular movement between the sections.

When the sections of the reactor 11 and tubes 15 have reached the desired temperatures, the reactants are introduced into the top of the reaction tubes 15 as described hereinbefore and pass downwardly through the tubes while being treated thermally and/or catalytically. The product gases are quenched and washed when they pass through the water seal 23 and finally to outlet pipe 24. Any water vapor which may accompany the product gases may be removed by conventional condensers or the like. This method will, of course, produce relatively cool product gases. If it is desired that the product gases have a relatively high temperature, this can be accomplished by using a higher boiling liquid than water in the seal 23. For example, tetra-cresyl silicate, inhibited orthodichlor benzene, silicone liquids, a eutectic mixture of 73.5% phenyl ether and 26.5% of diphenyl or the like may be used in place of water. Also, if desired the product gases may be passed directly from the dip pipe 22 to an indirect heat exchanger, thus eliminating the seal 23 altogether and providing a controlled cooling of the product gases.

A commercial unit based on the present invention would, of course, include manholes, peepholes, temperature indicators, means for periodically cleaning the reaction tubes and other conventional appurtenances, which have not been shown for purposes of simplification.

Although the reactor and the method of carrying out thermal reactions therein have been described with particular reference to the modification shown in the attached drawings, it will be understood that this modification is merely illustrative and that the scope of the present invention is defined in the appended claims.

What is claimed is:

1. Apparatus for continuously treating fluids at high temperatures comprising an elongated refractory lined shell, at least one tube disposed longitudinally therein and extending through the ends of said shell, inlet means for introducing fluids to be treated into one end of said at least one tube, exit means for withdrawing the treated fluids from the other end of said at least one tube, at least one refractory dividing wall extending transversely of said shell so as to divide said shell into a plurality of sections, at least one burner disposed in each of said sections for supplying heat to said at least one tube, said at least one dividing wall having at least one opening for passage therethrough of each of said tubes, and having a port to afford free communication between adjacent sections and exit means for withdrawing the combustion gases derived from the operation of said burners from said shell at a point adjacent the exit means for withdrawing said treated fluids from said tube whereby the combustion gases may pass from one section to the adjacent section in a direction concurrent with the flow of fluids in said tube.

2. Apparatus for continuously treating fluids at high temperatures comprising an elongated refractory lined shell, at least one tube disposed longitudinally therein and extending through the ends of said shell, inlet means for introducing fluids to be treated into one end of said at least one tube, exit means withdrawing the treated fluids from the other end of said at least one tube, at least two refractory dividing walls extending transversely of said shell so as to divide said shell into at least three sections, at least one burner disposed in each of said sections for supplying heat to said at least one tube, said dividing walls having at least one opening for passage therethrough of each of said tubes, and having a port to afford free communication between adjacent sections and exit means for withdrawing the gases derived from the operation of said burners from said shell at a point adjacent the exit means for withdrawing said treated fluids from said tube whereby the combustion gases pass from one section to the adjacent section in a direction concurrent with the flow of fluids in said tube.

3. Apparatus for continuously treating fluids at high temperatures comprising an elongated refractory lined shell, a plurality of tubes disposed longitudinally therein, circumferentially thereabout and extending through the ends of said shell, inlet means for introducing fluids to be treated into one end of said tubes, exit means for withdrawing the treated fluids from the other end of said tubes, at least two refractory dividing walls extending transversely of said shell so as to divide said shell into at least three sections, at least one burner disposed in each of said sections for supplying heat to said tubes, each of said dividing walls having openings therein for passage therethrough of each of said tubes and having a central port to afford free communication between adjacent sections and exit means for withdrawing the combustion gases derived from the operation of said burners from said shell at a point adjacent the exit means for withdrawing said treated fluids from said tube whereby the combustion gases may pass from one section to the adjacent section in a direction concurrent with the flow of fluids in said tube.

4. Apparatus as claimed in claim 3 wherein said burners are disposed tangentially in said sections to provide spiral flow of combustion gases around said tubes.

5. Apparatus as claimed in claim 3 wherein said tubes are composed of refractory material.

6. Apparatus as claimed in claim 5 including means for supporting said refractory tubes at the bottom thereof.

7. Apparatus as claimed in claim 5 wherein each of said refractory tubes is composed of a plurality of superimposed sections abutting end to end, the junctions of said sections being disposed within the openings in said dividing walls.

KENNETH W. STOOKEY.

References Cited in the file of this patent

UNITED STATES PATENTS

| Number | Name | Date |
| --- | --- | --- |
| 583,915 | Loomis | June 8, 1897 |
| 986,489 | Morehead | Mar. 14, 1911 |
| 1,307,362 | Kaufman | June 24, 1919 |
| 1,495,776 | Burdick | May 27, 1924 |
| 1,496,609 | Sharp et al. | June 3, 1924 |
| 1,843,063 | Burke et al. | Jan. 26, 1932 |
| 2,028,326 | Hanks | Jan. 21, 1936 |
| 2,173,984 | Shapleigh | Sept. 26, 1939 |
| 2,293,421 | Baetz | Aug. 18, 1942 |

FOREIGN PATENTS

| Number | Country | Date |
| --- | --- | --- |
| 301,969 | Great Britain | Dec. 13, 1928 |
| 7,983 | Great Britain | Mar. 1892 |
| 505,377 | France | July 1920 |
| 505,378 | France | July 1920 |